(12) United States Patent
Pohl et al.

(10) Patent No.: US 8,350,463 B2
(45) Date of Patent: Jan. 8, 2013

(54) ALPHA-SIALON PHOSPHOR

(75) Inventors: Bianca Pohl, Gilching (DE); Frank Jermann, Koenigsbrunn (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 126 days.

(21) Appl. No.: 13/058,196

(22) PCT Filed: Jul. 20, 2009

(86) PCT No.: PCT/EP2009/059309

§ 371 (c)(1),
(2), (4) Date: Mar. 8, 2011

(87) PCT Pub. No.: WO2010/020495

PCT Pub. Date: Feb. 25, 2010

(65) Prior Publication Data

US 2011/0149550 A1    Jun. 23, 2011

(30) Foreign Application Priority Data

Aug. 18, 2008 (DE) .................. 10 2008 038 249

(51) Int. Cl.
*H01J 1/62* (2006.01)
*H01J 63/04* (2006.01)
*C09K 11/08* (2006.01)

(52) U.S. Cl. ........ 313/503; 313/512; 313/483; 313/501; 313/502; 252/301.4 F

(58) Field of Classification Search .......... 313/498–512, 313/483–486; 252/301.4 F
See application file for complete search history.

(56) References Cited

U.S. PATENT DOCUMENTS

| 5,998,925 | A  | 12/1999 | Shimizu et al. |
| 7,078,732 | B1 | 7/2006  | Reeh et al. |
| 2006/0049414 | A1 | 3/2006 | Chandran et al. |

FOREIGN PATENT DOCUMENTS

| EP | 1498466 B1 | 5/2006 |
| EP | 1887067 A1 | 2/2008 |
| WO | 9750132 A1 | 12/1997 |
| WO | 2004029177 A1 | 4/2004 |
| WO | 2005103199 A1 | 11/2005 |

OTHER PUBLICATIONS

International Search Report issued in the basic application PCT/EP2009/059309.

*Primary Examiner* — Joseph L Williams

(57) ABSTRACT

A phosphor of the alpha-sialon type is provided, wherein the general empirical formula is $M1_{p/2}Si_{12-p-q}Al_{p+q}O_qN_{16-q}:D$; where M1 is one or more elements from the group Li, Mg, Ca, Y and the lanthanoids with the exception of Ce and La; D is a co-doping consisting of M2 and Mn, where M2=one or more elements from the group Ce, Pr, Eu, Tb, Yb and Er; in this situation q=0 to 2.5 and p=0.5 to 4 is chosen.

20 Claims, 3 Drawing Sheets

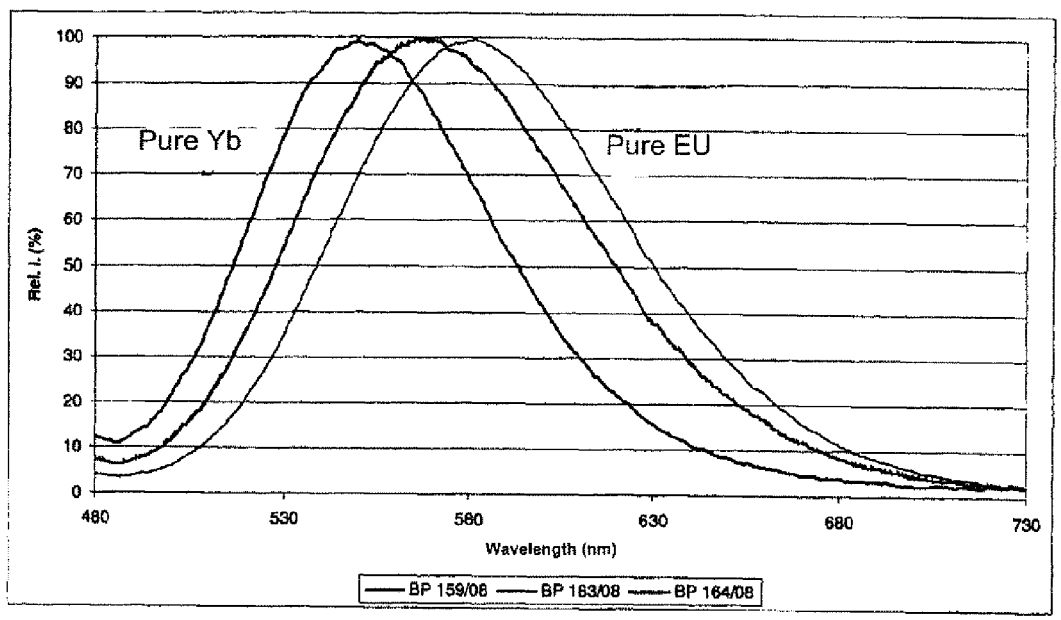
Fig. 1: Wavelength displacement Ca-alpha sialon
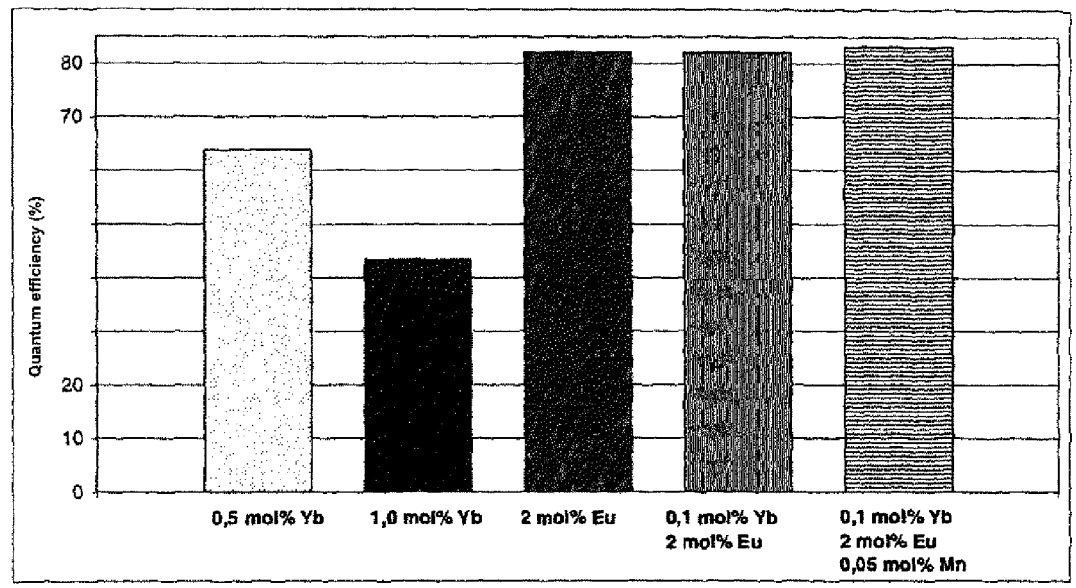
Fig. 3: Quantum efficiency

Fig. 2: FO Diagram

ALPHA-SIALON PHOSPHOR

RELATED APPLICATIONS

The present application is a national stage entry according to 35 U.S.C. §371 of PCT application No.: PCT/EP2009/059309 filed on Jul. 20, 2009, which claims priority from German application No.: 10 2008 038 249.3 filed on Aug. 18, 2008.

TECHNICAL FIELD

The invention is based on a phosphor in accordance with the preamble of claim 1 from the group of the alpha sialons. Such phosphors are intended in particular for use in light sources, LEDs for example.

BACKGROUND

Alpha sialons which are doped with Yb are known from EP 1 498 466. Other dopants are also cited there, such as Eu, Dy and Tb. Such phosphors are suited for use primarily in warm-white light sources.

SUMMARY

Various embodiments specify an alpha-sialon based phosphor which can also be employed for higher color temperatures.

The novel alpha-sialon based phosphor is characterized by a co-doping which uses Mn in addition to known dopants. This renders possible an efficient light source which can be excited by blue or UV light. This phosphor is temperature stable and emits over a wide band in the yellow spectral region.

The dominant wavelength $\lambda_{dom}$ lies in the range of typically 575 to 578 nm. This means that it is possible in particular to manufacture color location stable, cold-white to daylight-white light sources such as LEDs on the basis of a conversion LED.

Alpha sialons doped with Eu rate among the most temperature stable phosphors of all. In this situation, the emission wavelength has hitherto unfortunately been incompatible with the requirements described above. In particular, it has thus hitherto not been possible to produce any white LEDs satisfying the requirements described above.

The alpha sialons known hitherto have the general empirical formula M1xM2y(Si,Al)12(O,N)16, where M1 is generally one or more elements from the group Li, Mg, Ca, Y and the lanthanoids with the exception of Ce and La. M2 is one or more elements from the group Ce, Pr, Eu, Tb, Yb and Er, which act as an activator, where $0.3 \leq x+y \leq 1.5$ and $0 < y < 0.7$. Such alpha sialons are however only suitable for a few areas of application on account of their optical properties. Whereas for example the Yb-doped Ca alpha sialon (M2=Yb) having comparatively low quantum yields emits at too short a wavelength in the green spectral region, the Eu-doped variant (M2=Eu) is displaced too far into the long-wave orange-red spectral region with its emission.

Competing phosphor systems such as the orthosilicates exhibit great weaknesses with regard to the stability of the emission, for example high temperature quenching in the case of a temperature in excess of 100° C., as is to be expected in many applications. Moreover, the emission is very narrow-band and is thus unsuitable for many illumination purposes. Although the narrowband emitting (Sr,Ba)Si2O2N2:Eu is very temperature stable, it does however otherwise exhibit similar emission properties to the yellow orthosilicate.

According to the invention, an alpha sialon having a general empirical formula $M1_{p/2}Si_{12-p-q}Al_{p+q}O_qN_{16-q}$:D is now proposed, wherein M1 as proposed above is therefore one or more elements from the group Li, Mg, Ca, Y and the lanthanoids with the exception of Ce and La. The dopant is now however a co-doping consisting of the known activators M2 as above. M2 is one or more elements from the group Ce, Pr, Eu, Tb, Yb and Er. In this situation, D is a co-dopant consisting of one or two of the known activators, but together with a doping of Mn. This can formally be expressed by D=(M2, Mn). Finally q=0 to 2.5 and p=0.5 to 4 are chosen here.

By preference in this situation, M2 is either Eu or Yb, or a mixture of both. Here the atomic proportion of Mn in D is always smaller than that of M2. The proportion of Mn in D preferably lies in the range 1 to 50% of M2.

The manufacturing process for producing an alpha-sialon phosphor having Mn co-doping takes place in principle in similar fashion to that described in the literature for known alpha-sialon phosphors.

BRIEF DESCRIPTION OF THE DRAWINGS

The invention will be described in detail in the following with reference to a plurality of exemplary embodiments. In the figures:

FIG. 1 shows the wavelength displacement depending on dopant in the case of a Ca alpha sialon;

FIG. 3 shows the quantum efficiency QE of differently doped sialons;

DETAILED DESCRIPTION

The following detailed description refers to the accompanying drawings that show, by way of illustration, specific details and embodiments in which the invention may be practiced.

The production of a Ca alpha sialon with Yb co-doping in addition to Eu takes place in the following manner:

The starting substances CaCO3, Si3N4, AlN, Eu2O3 and Yb2O3 are weighed in stoichiometrically and are homogenized for several hours. The educt mixture is subsequently annealed for several hours (2 to 7 hours) in a reducing atmosphere in a tube furnace. A temperature of between 1500 and 2000° C. is chosen. A second annealing process can then be carried out. This similarly takes place in a reducing atmosphere between 1200 and 2000° C.

The production of a Ca alpha sialon with triple doping Eu, Yb, Mn takes place in the following manner:

The starting substances CaCO3, Si3N4, AlN, Eu2O3 and Yb2O3 and Mn2O3 are weighed in stoichiometrically and are homogenized for several hours. The educt mixture is subsequently annealed for several hours (2 to 7 hours) in a reducing atmosphere in a tube furnace. A temperature of between 1500 and 2000° C. is chosen. A second annealing process can then be carried out. This similarly takes place in a reducing atmosphere between 1200 and 2000° C.

Depending on the activator concentration and the relative proportions of the individual co-dopants, the wavelength of the sialon can be displaced in a suitable manner depending on the desired application. Examples of color locations are given in Table 1.

| Sample | Eu in mol % | Yb in mol % | Ce in mol % | Mn in mol % | x | y | $\lambda_{Schw}$ (nm) | $\lambda_{dom}$ (nm) |
|---|---|---|---|---|---|---|---|---|
| 152/08 | — | 0.5 | | | 0.386 | 0.568 | 563.1 | 562.9 |
| 158/08 | 2 | — | | | 0.486 | 0.495 | 588.3 | 577.3 |
| 159/08 | 4 | — | | | 0.497 | 0.489 | 591.1 | 578.7 |
| 161/08 | 4 | 0.5 | | | 0.490 | 0.494 | 589.3 | 577.7 |
| 162/08 | 4 | 1 | | | 0.482 | 0.499 | 587.8 | 576.7 |
| 163/08 | 2 | 1 | | 0.05 | 0.458 | 0.518 | 581.2 | 573.3 |
| 164/08 | — | 1 | | | 0.387 | 0.568 | 564.2 | 563.1 |

FIG. 1 shows the wavelength displacement in the case of Ca alpha sialon for pure Eu-doping, for pure Yb-doping and for a Yb, Eu co-doping.

Figure 2:
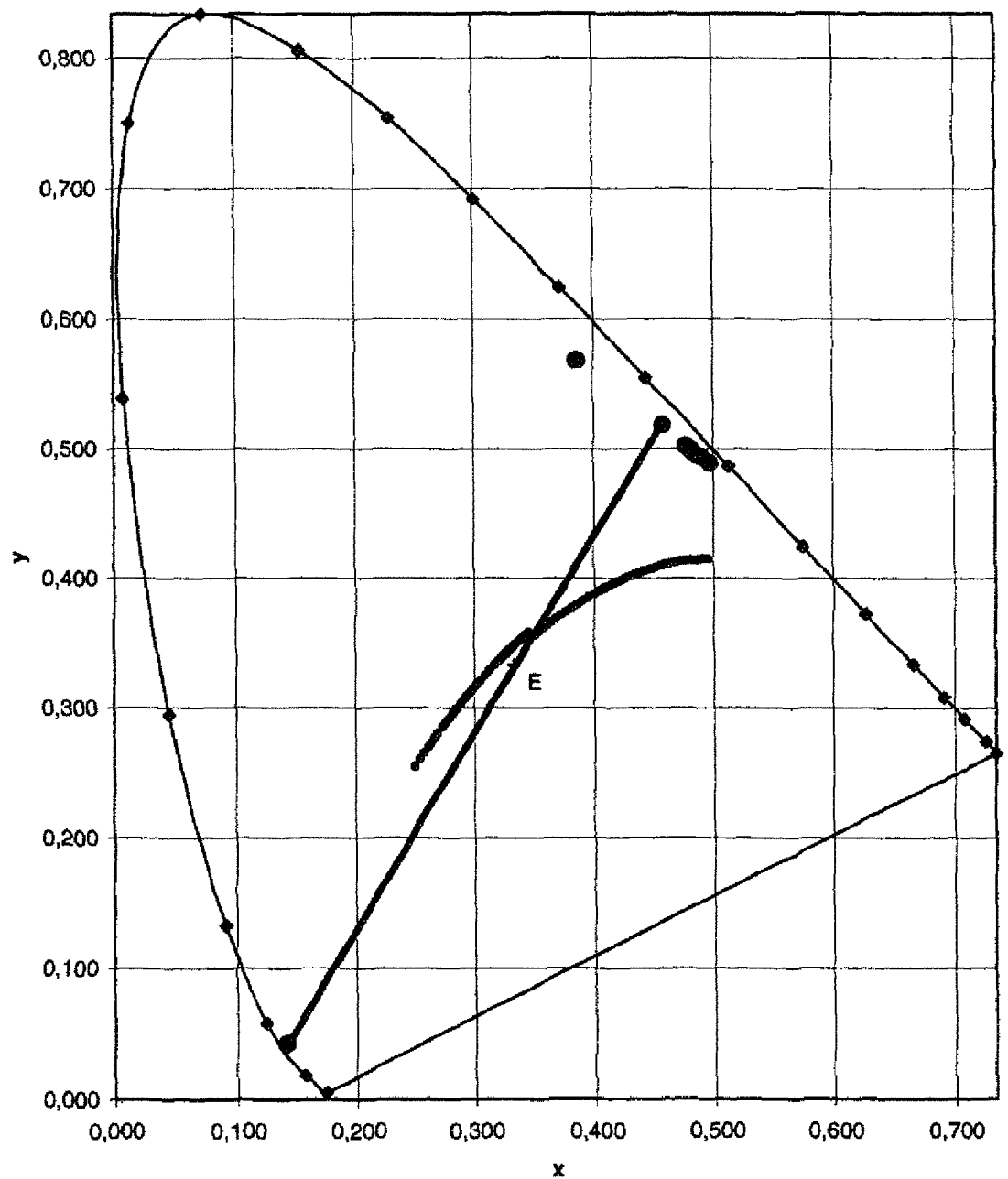
FIG. 2 shows a color location diagram for a blue LED and different sialons.

FIG. 2 shows a color location diagram for the phosphors from Table 1. This makes it clear that sialons can be achieved which together with a blue LED span a straight line which passes more or less accurately through the white point E.

Table 2 shows the optical properties of different phosphors in the case of double and triple co-doping. The excitation occurred at 460 nm. It is clear that co-doping with Mn at a concentration of 0.05 to 0.3 mol % of M1 should be chosen.

| Sample | Eu in mol % | Yb in mol % | Ce in mol % | Mn in mol % | x | y | $\lambda_{dom}$ (nm) | Q.E. (%) | Rel. bright. (%) |
|---|---|---|---|---|---|---|---|---|---|
| 152/08 | — | 0.5 | | | 0.386 | 0.568 | 562.9 | 63.8 | 100 |
| 158/08 | 2 | — | | | 0.486 | 0.495 | 577.3 | 82.2 | 210 |
| 159/08 | 4 | — | | | 0.497 | 0.489 | 578.7 | 82.7 | 280 |
| 164/08 | — | 1 | | | 0.387 | 0.568 | 563.1 | 43.3 | 102 |
| 165/08 | 2 | 0.1 | | | 0.481 | 0.500 | 576.6 | 82.1 | 217 |
| 176/08 | 2 | 0.1 | 0.1 | | 0.480 | 0.500 | 576.5 | 80.9 | 209 |
| 185/08 | 2 | 0.1 | | 0.05 | 0.481 | 0.499 | 576.6 | 83.2 | 218 |
| 164/08 | 2 | 0.1 | | 0.1 | 0.477 | 0.502 | 576.1 | 80.0 | 210 |

Without Eu, the quantum efficiency Q.E. and the relative brightness are relatively poor. This is due to the fact that without Eu the absorption of the new phosphor is relatively poor.

FIG. 3 shows the quantum efficiency Q.E. as a percentage for selected phosphors. The dopant is given in each case. A triple doping consisting of Eu, Yb, and Mn exhibits the highest Q.E.

Overall, it is thus apparent that the emission wavelength of the otherwise efficient and stable alpha sialon, in particular Ca sialon, which is inappropriate for many applications can be expediently adjusted by means of suitable Eu, Mn co-doping. Eu doping alone gives too long a wavelength, Yb alone too short a wavelength. Co-doping with Eu and Yb is not particularly well suited because the luminescence is only weak. Astonishingly however, a small proportion of Mn in the range 0.05 to 0.3 mol % is sufficient in order to improve the absorption and thus the conversion efficiency. It is clear that the smallest quantities of Mn achieve an additional short-wave displacement. It is thus more easily possible to emit in the desired light color. The color temperature is at least 4200 K. Depending on the admixture it can also reach 6500 K and higher.

When such phosphors are used in a white LED together with an InGaN LED, a construction similar to that described in WO 97/50132 is employed. For example, a phosphor in accordance with the above exemplary embodiments is dispersed in epoxy resin and an LED having an emission maximum of approximately 450 nm (blue) is encased with this resin mixture. The mixture of the blue LED radiation with the yellow phosphor emission results in this case in a color location of typically x=0.359/y=0.350, corresponding to white light of color temperature 4500 K.

The phosphors described above generally exhibit a yellow surface color. They emit in the yellow spectral region. In the event of the addition or sole use of Ga instead of Al, the emission is displaced more in the green direction, which means in particular that higher color temperatures can also be realized.

Such phosphors can be used for BY based conversion LEDs, in other words a blue LED and yellow converting phosphor which converts a part of the blue radiation. Such a phosphor can however also be applied for the purpose of RGB conversion. In this situation, the LED which transmits primary radiation can emit in the UV range or be a blue LED, as is already known. The novel phosphors are also well suited for use in the case of even higher grade 4-color conversion LEDs of the BGOR type.

Figure 4:
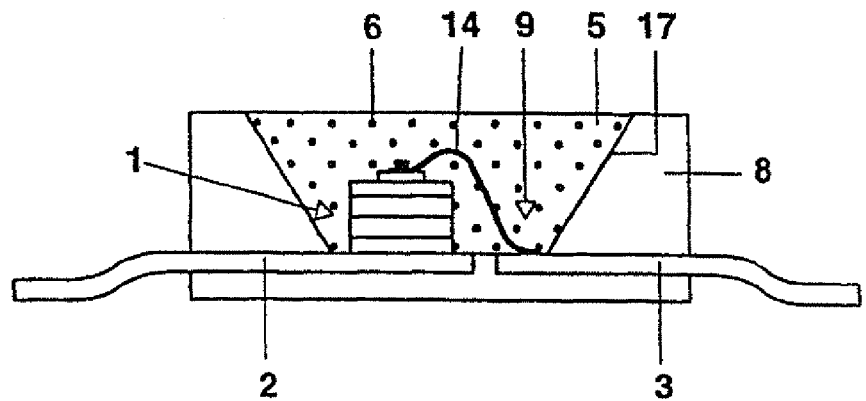
FIG. 4 shows a semiconductor device which serves as a light source (LED) of white light.

For use in a white LED together with a GaInN chip, a construction similar to that described in U.S. Pat. No. 5,998,925 is employed for example. The construction of such a light source of white light is illustrated explicitly in FIG. 4. The light source is a semiconductor device (chip 1) of the InGaN type having a peak emission wavelength of 460 nm, having a first and second electrical connection 2,3, which is embedded into an opaque basic housing 8 in the region of a recess 9. One of the connections 3 is connected to the chip 1 by way of a bonding wire 14. The recess has a wall 17 which serves as a reflector for the blue primary radiation of the chip 1. The recess 9 is filled with a casting compound which contains as its main components an epoxy casting resin (80 to 90% by weight) and phosphor pigments 6 (less than 15% by weight). Further small proportions are accounted for by, amongst other things, methyl ether and Aerosil. The phosphor pigments are alpha-sialon pigments.

Figure 5:
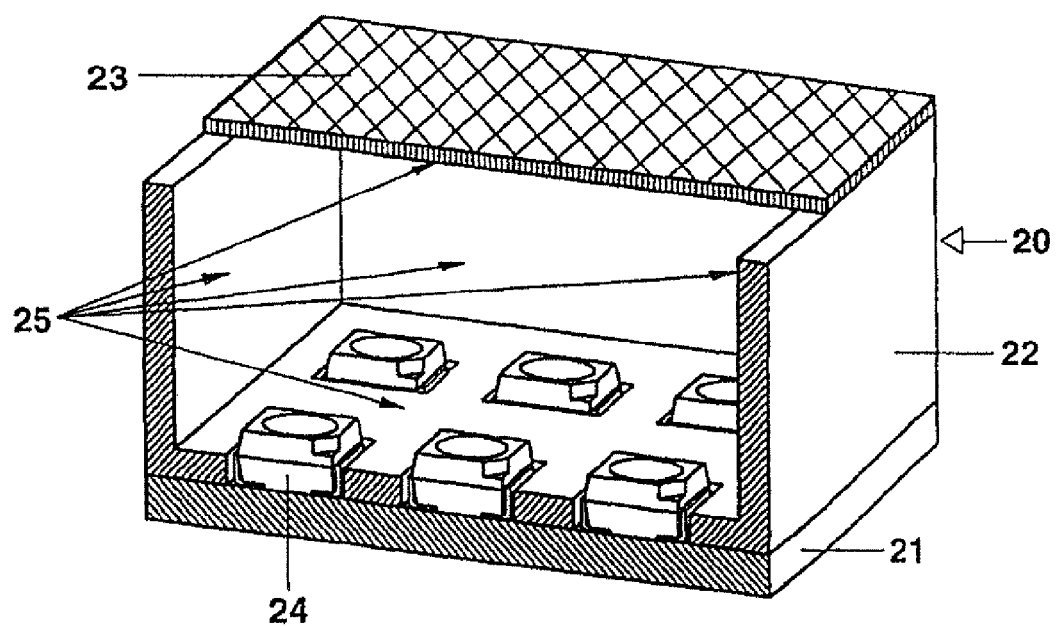
FIG. 5 shows an illumination unit having phosphors in accordance with the present invention.

FIG. 5 shows a section of a softlight 20 as an illumination unit. It consists of a common carrier 21, onto which is adhesively bonded a cuboid outer housing 22. Its upper side is provided with a common cover 23. The cuboid housing has recesses, in which are accommodated individual semiconductor components 24. They are UV-emitting light-emitting diodes having a peak emission of 360 nm. The conversion into white light is carried out by means of conversion layers which are situated directly in the cast resin of the individual LEDs similar to what is described under FIG. 4 or layers 25 which are affixed to all the surfaces accessible to the UV radiation. These include the internally situated upper surfaces of the side walls of the housing, of the cover and of the base part. The conversion layers 25 comprise three phosphors which emit in the yellow, green and blue spectral region, using the phosphors according to the invention, which emit in the yellow spectral region.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A phosphor of the alpha-sialon type,
   wherein the general empirical formula is $M1_{p/2}Si_{12-p-q}Al_{p+q}N_{16-q}:D$;
   where M1 is one or more elements from the group Li, Mg, Ca, Y and the lanthanoids with the exception of Ce and La;
   D is a co-doping consisting of M2 and Mn, where M2=one or more elements from the group Ce, Pr, Eu, Tb, Yb and Er;
   in this situation q=0 to 2.5 and p=0.5 to 4 is chosen.

2. The phosphor as claimed in claim 1,
   wherein M1 is selected from Ca, Mg or a mixture thereof.

3. The phosphor as claimed in claim 1,
   wherein M2 is selected from M2=Eu, Yb alone or in a mixture.

4. The phosphor as claimed in claim 1,
   wherein the proportion of Mn is between 1 and 50% of M2.

5. The phosphor as claimed in claim 1,
   wherein the proportion of Mn is between 0.05 and 0.3 mol % of M1.

6. An illumination unit, comprising:
   at least one light source,
   whereby the light source is configured to emit primary radiation in the range from 300 nm to 485 nm,
   whereby this radiation is partially or completely converted into radiation of longer wavelength by phosphors which are exposed to the primary radiation from the light source,
   wherein the conversion is carried out at least with the aid of a phosphor which emits yellow with a wavelength of the peak emission at 570 nm to 580 nm and which originates from the class of the alpha sialons of a type, wherein the general empirical formula is $M1_{p/2}Si_{12-p-q}Al_{p+q}O_qN_{16-q}:D$; where M1 is one or more elements from the group Li, Mg, Ca, Y and the lanthanoids with the exception of Ce and La; D is a co-doping consisting of M2 and Mn, where M2=one or more elements from the group Ce, Pr, Eu, Tb, Yb and Er; in this situation q=0 to 2.5 and p=0.5 to 4 is chosen.

7. The illumination unit as claimed in claim 6, wherein the Al is replaced partially by Ga.

8. The illumination unit as claimed in claim 6,
   wherein $q \leq 1$ and/or p=2 to 3 is chosen.

9. The illumination unit as claimed in claim 6,
   wherein the mean particle diameter of the phosphor powder is chosen between 0.5 and 5 µm.

10. The illumination unit as claimed in claim 6,
    wherein for the generation of white light the primarily emitted radiation lies in the wavelength range 330 nm to 370 nm, whereby the primary radiation emitted is exposed to at least two phosphors having an emission maximum in the blue and in the yellow-orange for the conversion.

11. The illumination unit as claimed in claim 6,
    wherein the primary radiation is exposed to at least one further phosphor which emits either in the green or in the red for the conversion.

12. The illumination unit as claimed in claim 6,
    wherein the further phosphor is a chlorosilicate or a Y- or Tb-based garnet.

13. The illumination unit as claimed in claim 6,
    wherein for the generation of white light the primarily emitted radiation lies in the blue wavelength range from 430 nm to 470 nm, whereby the primarily emitted blue radiation is exposed to two phosphors having an emission maximum in the yellow and in the green, wherein the phosphor is a phosphor of the alpha-sialon type, wherein the general empirical formula is $M1_{p/2}Si_{12-p-q}Al_{p+q}O_qN_{16-q}:D$; where M1 is one or more elements from the group Li, Mg, Ca, Y and the lanthanoids with the exception of Ce and La; D is a co-doping consisting of M2 and Mn, where M2=one or more elements from the group Ce, Pr, Eu, Tb, Yb and Er; in this situation q=0 to 2.5 and p=0.5 to 4 is chosen.

14. The illumination unit as claimed in claim 6,
    wherein for the generation of colored light the primarily emitted radiation lies in the blue wavelength range from 430 nm to 485 nm, whereby the primarily emitted blue radiation is exposed to a single phosphor having an emission maximum in the yellow, wherein the phosphor is a phosphor of the alpha-sialon type, wherein the general empirical formula is $M1_{p/2}Si_{12-p-q}Al_{p+q}O_qN_{16-q}:D$; where M1 is one or more elements from the group Li, Mg, Ca, Y and the lanthanoids with the exception of Ce and La; D is a co-doping consisting of M2 and Mn, where M2=one or more elements from the group Ce, Pr, Eu, Tb, Yb and Er; in this situation q=0 to 2.5 and p=0.5 to 4 is chosen.

15. The illumination unit as claimed in claim 14,
    wherein the proportion of the yellow phosphor in the mixture is approximately 0.5 to 15%.

16. The illumination unit as claimed in claim 6,
    wherein a light-emitting diode emitting in a short wavelength range is employed as the primary radiation source.

17. The illumination unit as claimed in claim 6,
    wherein the illumination unit is a luminescence conversion LED wherein the phosphors are directly or indirectly in contact with the chip.

18. The illumination unit as claimed in claim 6,
    wherein the illumination unit is an array of LEDs.

19. The illumination unit as claimed in claim 18,
    wherein at least one of the phosphors is fitted on an optical device fitted in front of the LED array.

20. The illumination unit as claimed in claim 7,
    wherein the Al is replaced partially by up to 20 mol % by Ga.

* * * * *